United States Patent
Yoon et al.

(10) Patent No.: US 10,912,126 B2
(45) Date of Patent: Feb. 2, 2021

(54) METHOD AND USER EQUIPMENT FOR TRANSMITTING RANDOM ACCESS PREAMBLE, AND METHOD AND BASE STATION FOR RECEIVING RANDOM ACCESS PREAMBLE

(71) Applicant: LG Electronics Inc., Seoul (KR)

(72) Inventors: Sukhyon Yoon, Seoul (KR); Hyunsoo Ko, Seoul (KR); Kijun Kim, Seoul (KR); Eunsun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/489,765

(22) PCT Filed: Mar. 5, 2018

(86) PCT No.: PCT/KR2018/002581
§ 371 (c)(1),
(2) Date: Aug. 29, 2019

(87) PCT Pub. No.: WO2018/160046
PCT Pub. Date: Sep. 7, 2018

(65) Prior Publication Data
US 2020/0068617 A1    Feb. 27, 2020

Related U.S. Application Data

(60) Provisional application No. 62/466,377, filed on Mar. 3, 2017, provisional application No. 62/488,106, filed on Apr. 21, 2017.

(51) Int. Cl.
*H04W 74/08* (2009.01)
*H04J 13/00* (2011.01)
*H04W 72/04* (2009.01)

(52) U.S. Cl.
CPC ..... *H04W 74/0833* (2013.01); *H04J 13/0062* (2013.01); *H04W 72/044* (2013.01)

(58) Field of Classification Search
CPC ............. H04W 74/0833; H04W 72/044; H04J 13/0062
See application file for complete search history.

(56) References Cited

U.S. PATENT DOCUMENTS

| 2014/0198761 A1* | 7/2014 | Hooli | H04W 72/085 370/329 |
| 2015/0365977 A1 | 12/2015 | Tabet et al. | |
| 2016/0323056 A1* | 11/2016 | Park | H04J 13/0022 |
| 2019/0223226 A1* | 7/2019 | Zhao | H04W 74/08 |

FOREIGN PATENT DOCUMENTS

| KR | 10-2016-0041977 A | 4/2016 |
| WO | 2015/130067 A1 | 9/2015 |
| WO | 2017/019119 A1 | 2/2017 |
| WO | 2017/028273 A1 | 2/2017 |

\* cited by examiner

*Primary Examiner* — Duc C Ho
(74) *Attorney, Agent, or Firm* — Dentons US LLP

(57) ABSTRACT

A user equipment of the present invention generates a preamble sequence, which includes a base sequence N number of times. The user equipment maps, by comb-type, the base sequence in a frequency domain, and maps the base sequence to one of N kinds of frequency locations, thereby generating the preamble sequence. The user equipment transmits a random access preamble including the preamble sequence.

14 Claims, 12 Drawing Sheets

(a)

(b)

(a) Repetition & orthogonal covering (time domain)

(b) Repetition & orthogonal covering (frequency domain)

(a) Time axis receiver structure (b) Frequency axis receiver structure (a)

(b)

METHOD AND USER EQUIPMENT FOR TRANSMITTING RANDOM ACCESS PREAMBLE, AND METHOD AND BASE STATION FOR RECEIVING RANDOM ACCESS PREAMBLE

This application is a National Stage Entry of International Application No. PCT/KR2018/002581 filed Mar. 5, 2018, which claims the benefit of U.S. Provisional Application Nos. 62/466,377 filed Mar. 3, 2017 and 62/488,106 filed Apr. 21, 2017, all of which are hereby incorporated by reference in their entirety for all purposes as if fully set forth herein.

TECHNICAL FIELD

The present invention relates to a wireless communication system. Particularly, the present invention relates to a method and apparatus for transmitting/receiving a random access preamble.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services anytime and anywhere by connecting a plurality of devices and objects to each other is one main issue to be considered in future-generation communication.

Further, a communication system to be designed in consideration of services/UEs sensitive to reliability and latency is under discussion. The introduction of future-generation RAT has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

In addition, with development of smart devices, a new method of efficiently transmitting/receiving small volumes of data or efficiently transmitting/receiving less frequently generated data is needed.

In addition, a signal transmission/reception method is required in the system supporting new radio access technologies using high frequency bands.

The technical objects that can be achieved through the present invention are not limited to what has been particularly described hereinabove and other technical objects not described herein will be more clearly understood by persons skilled in the art from the following detailed description.

Technical Solution

It may further include information regarding a subset.

In each aspect of the present invention, the preamble sequence may be obtained by multiplication of the base sequence repeated N times in the time domain by a sinusoidal signal having a frequency of $j*n*1/T_{RACH}$, where j is an imaginary unit.

In each aspect of the present invention, the preamble sequence may include a sequence obtained by multiplying the base sequence repeated N times in the time domain by the sinusoidal signal $e^{-j2\pi n\Delta ft}$ or a sequence obtained by multiplying an i-th repetition of the base sequence for i=0, ..., N−1 by $e^{-j\pi n\Delta f(t+i*\Delta T)}$, where $\Delta T$ is the length of the base sequence.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

Also, it is possible to efficiently transmit/receive a small amount of data for smart devices, or efficiently transmit/receive data occurring at a low frequency.

Also, signals in a new radio access technology system can be transmitted/received effectively.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

Figure 1:
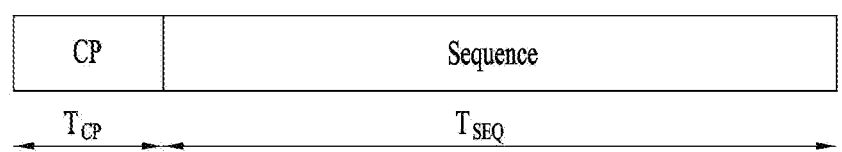
FIG. 1 illustrates a random access preamble format in a legacy LTE/LTE-A system.

FIG. 1 illustrates a random access preamble format in a legacy LTE/LTE-A system.

In the legacy LTE/LTE-A system, a random access preamble, i.e., a RACH preamble, includes a cyclic prefix having a length $T_{CP}$ and a sequence part having a length $T_{SEQ}$ in a physical layer. The parameter values $T_{CP}$ and $T_{SEQ}$ are listed in the following table, and depend on the frame structure and the random access configuration. Higher layers control the preamble format.

TABLE 1

| Preamble format | $T_{CP}$ | $T_{SEQ}$ |
|---|---|---|
| 0 | 3168 · $T_s$ | 24576 · $T_s$ |
| 1 | 21024 · $T_s$ | 24576 · $T_s$ |
| 2 | 6240 · $T_s$ | 2 · 24576 · $T_s$ |
| 3 | 21024 · $T_s$ | 2 · 24576 · $T_s$ |
| 4 | 448 · $T_s$ | 4096 · $T_s$ |

In the LTE/LTE-A system, the RACH preamble is transmitted in a UL subframe. The transmission of a random access preamble is restricted to certain time and frequency resources. These resources are called PRACH resources, and enumerated in increasing order of the subframe number within the radio frame and the PRBs in the frequency domain such that index 0 correspond to the lowest numbered PRB and subframe within the radio frame. Random access resources are defined according to the PRACH configuration index (refer to the standard document of 3GPP TS 36.211). The PRACH configuration index is given by a higher layer signal (transmitted by an eNB).

The sequence part of the RACH preamble (hereinafter, preamble sequence) uses a Zadoff-Chu sequence. The preamble sequences for RACH are generated from Zadoff-Chu sequences with zero correlation zone, generated from one or several root Zadoff-Chu sequences. The network configures the set of preamble sequences the UE is allowed to use. In the legacy LTE/LTE-A system, there are 64 preambles available in each cell. The set of 64 preamble sequences in a cell is found by including first, in the order of increasing cyclic shift, all the available cyclic shifts of a root Zadoff-Chu sequence with the logical index RACH_ROOT_SEQUENCE, where RACH_ROOT_SEQUENCE is broadcasted as part of the system information. Additional preamble sequences, in case 64 preambles cannot be generated from a single root Zadoff-Chu sequence, are obtained from the root sequences with the consecutive logical indexes until all the 64 sequences are found. The logical root sequence order is cyclic: the logical index 0 is consecutive to 837. The relation between a logical root sequence index and physical root sequence index u is given by Table 2 and Table 3 for preamble formats 0~3 and 4, respectively.

TABLE 2

| Logical root sequence number | Physical root sequence number u (in increasing order of the corresponding logical sequence number) |
|---|---|
| 0~23 | 129, 710, 140, 699, 120, 719, 210, 629, 168, 671, 84, 755, 105, 734, 93, 746, 70, 769, 60, 7792, 837, 1, 838 |
| 24~29 | 56, 783, 112, 727, 148, 691 |
| 30~35 | 80, 759, 42, 797, 40, 799 |

TABLE 2-continued

| Logical root sequence number | Physical root sequence number u (in increasing order of the corresponding logical sequence number) |
|---|---|
| 36~41 | 35, 804, 73, 766, 146, 693 |
| 42~51 | 31, 808, 28, 811, 30, 809, 27, 812, 29, 810 |
| 52~63 | 24, 815, 48, 791, 68, 771, 74, 765, 178, 661, 136, 703 |
| 64~75 | 86, 753, 78, 761, 43, 796, 39, 800, 20, 819, 21, 818 |
| 76~89 | 95, 744, 202, 637, 190, 649, 181, 658, 137, 702, 125, 714, 151, 688 |
| 90~115 | 217, 622, 128, 711, 142, 697, 122, 717, 203, 636, 118, 721, 110, 729, 89, 750, 103, 736, 61, 778, 55, 784, 15, 824, 14, 825 |
| 116~135 | 12, 827, 23, 816, 34, 805, 37, 802, 46, 793, 207, 632, 179, 660, 145, 694, 130, 709, 223, 616 |
| 136~167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168~203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204~263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264~327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328~383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384~455 | 3, 836, 19, 820, 22, 817, 41, 798, 38, 801, 44, 795, 52, 787, 45, 794, 63, 776, 67, 772, 72767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456~513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514~561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| 562~629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630~659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| 660~707 | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| 708~729 | 346, 493, 339, 500, 351, 488, 306, 533, 289, 550, 400, 439, 378, 461, 374, 465, 415, 424, 270, 569, 241, 598 |
| 730~751 | 231, 608, 260, 579, 268, 571, 276, 563, 409, 430, 398, 441, 290, 549, 304, 535, 308, 531, 358, 481, 316, 523 |
| 752~765 | 293, 546, 288, 551, 284, 555, 368, 471, 253, 586, 256, 583, 263, 576 |
| 766~777 | 242, 597, 274, 565, 402, 437, 383, 456, 357, 482, 329, 510 |
| 778~789 | 317, 522, 307, 532, 286, 553, 287, 552, 266, 573, 261, 578 |
| 790~795 | 236, 603, 303, 536, 356, 483 |
| 796~803 | 355, 484, 405, 434, 404, 435, 406, 433 |
| 804~809 | 235, 604, 267, 572, 302, 537 |
| 810~815 | 309, 530, 265, 574, 233, 606 |
| 816~819 | 367, 472, 296, 543 |
| 820~837 | 336, 503, 305, 534, 373, 466, 280, 559, 279, 560, 419, 420, 240, 599, 258, 581, 229, 610 |

TABLE 3

| Logical root sequence number | Physical root sequence number u (in increasing order of the corresponding logical sequence number) | | | | | | | | | | | | | | | | | | | |
|---|---|---|---|---|---|---|---|---|---|---|---|---|---|---|---|---|---|---|---|---|
| 0~19 | 1 | 138 | 2 | 137 | 3 | 136 | 4 | 135 | 5 | 134 | 6 | 133 | 7 | 132 | 8 | 131 | 9 | 130 | 10 | 129 |
| 20~39 | 11 | 128 | 12 | 127 | 13 | 126 | 14 | 125 | 15 | 124 | 16 | 123 | 17 | 122 | 18 | 121 | 19 | 120 | 20 | 119 |
| 40~59 | 21 | 118 | 22 | 117 | 23 | 116 | 24 | 115 | 25 | 114 | 26 | 113 | 27 | 112 | 28 | 111 | 29 | 110 | 30 | 109 |
| 60~79 | 31 | 108 | 32 | 107 | 33 | 106 | 34 | 105 | 35 | 104 | 36 | 103 | 37 | 102 | 38 | 101 | 39 | 100 | 40 | 99 |
| 80~99 | 41 | 98 | 42 | 97 | 43 | 96 | 44 | 95 | 45 | 94 | 46 | 93 | 47 | 92 | 48 | 91 | 49 | 90 | 50 | 89 |
| 100~119 | 51 | 88 | 52 | 87 | 53 | 86 | 54 | 85 | 55 | 84 | 56 | 83 | 57 | 82 | 58 | 81 | 59 | 80 | 60 | 79 |
| 120~137 | 61 | 78 | 62 | 77 | 63 | 76 | 64 | 75 | 65 | 74 | 66 | 73 | 67 | 72 | 68 | 71 | 69 | 70 | — | — |
| 138~837 | N/A | | | | | | | | | | | | | | | | | | | | u-th root Zadoff-Chu sequence is defined by the following equation.

$$x_u(n) = e^{-j\frac{\pi u n(n+1)}{N_{ZC}}}, 0 \le n \le N_{ZC} - 1 \qquad \text{Equation 1}$$

The length $N_{ZC}$ of the Zadoff-Chu sequence is given by the following table.

TABLE 4

| Preamble format | $N_{ZC}$ |
| --- | --- |
| 0~3 | 839 |
| 4 | 139 |

From the u-th root Zadoff-Chu sequence, random access preambles with zero correlation zones of length $N_{ZC}-1$ are defined by cyclic shifts according to $x_{u,v}(n)=x_u((n+C_v) \bmod N_{ZC})$, where the cyclic shift is given by the following equation.

$$C_v = \begin{cases} vN_{CS} & v=0,1,\ldots,\lfloor N_{ZC}/N_{CS}\rfloor-1, N_{CS} \ne 0 \text{ for unrestricted sets} \\ 0 & N_{CS}=0 \text{ for unrestricted sets} \\ d_{start}\lfloor v/n_{shift}^{RA}\rfloor + (v \bmod n_{shift}^{RA})N_{CS} & v=0,1,\ldots,n_{shift}^{RA}n_{group}^{RA}+\bar{n}_{shift}^{RA}-1 \text{ for restricted sets} \end{cases} \qquad \text{Equation 2}$$

$N_{CS}$ is given by Table 5 for preamble formats 0~3 and by Table 6 for preamble format 4.

TABLE 5

| zeroCorrelationZoneConfig | $N_{CS}$ value | |
| --- | --- | --- |
| | Unrestricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

TABLE 6

| zeroCorrelationZoneConfig | $N_{CS}$ value |
| --- | --- |
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |
| 9 | N/A |
| 10 | N/A |
| 11 | N/A |
| 12 | N/A |
| 13 | N/A |
| 14 | N/A |
| 15 | N/A |

The parameter zeroCorrelationZoneConfig is provided by higher layers. The parameter High-speed-flag provided by higher layers determines if unrestricted set or restricted set shall be used.

The variable $d_u$ is the cyclic shift corresponding to a Doppler shift of magnitude $1/T_{SEQ}$ and is given by the following equation.

$$d_u = \begin{cases} p & 0 \le p < N_{ZC}/2 \\ N_{ZC} - p & \text{otherwise} \end{cases} \qquad \text{Equation 3}$$

p is the smallest non-negative integer that fulfils (pu) mod $N_{ZC}=1$. The parameters for restricted sets of cyclic shifts depend on $d_u$. For $N_{CS} \le d_u < N_{ZC}/3$, the parameters are given by the following equation.

$$n_{shift}^{RA} = \lfloor d_u/N_{CS} \rfloor$$

$$d_{start} = 2d_u + n_{shift}^{RA}N_{CS}$$

$$n_{group}^{RA} = \lfloor N_{ZC}/d_{start} \rfloor$$

$$\bar{n}_{shift}^{RA} = \max(\lfloor N_{ZC}-2d_u-n_{group}^{RA}d_{start}\rfloor/N_{CS}\rfloor,0) \qquad \text{Equation 4}$$

For $N_{ZC}/3 \le d_u < (N_{ZC}-N_{CS})/2$, the parameters are given by the following equation.

$$n_{shift}^{RA} = \lfloor (N_{ZC}-2d_u)/N_{CS} \rfloor$$

$$d_{start} = N_{ZC} - 2d_u + n_{shift}^{RA}N_{CS}$$

$$n_{group}^{RA} = \lfloor d_u/d_{start} \rfloor$$

$$\bar{n}_{shift}^{RA} = \min(\max(\lfloor d_u-n_{group}^{RA}d_{start}\rfloor/N_{CS}\rfloor,0), n_{shift}^{RA}) \qquad \text{Equation 5}$$

For all other values of $d_u$, there are no cyclic shifts in the restricted set.

The time-continuous random access signal s(t) which is the baseband signal of RACH is defined by the following Equation.

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})} \qquad \text{Equation 6}$$

where $0 \le t < T_{Seq}-T_{CP}$, $\beta_{PRACH}$ is an amplitude scaling factor in order to conform to the transmit power specified in 3GPP TS 36.211, and $k_0=n^{RA}_{PRB}N^{RB}_{sc}-N^{UL}_{RB}N^{RB}_{sc}/2$. $N^{RB}_{sc}$ denotes the number of subcarriers constituting one resource block (RB). $N^{UL}_{RB}$ denotes the number of RBs in a UL slot and depends on a UL transmission bandwidth. The location in the frequency domain is controlled by the parameter $n^{RA}_{PRB}$ is derived from the section 5.7.1 of 3GPP TS 36.211. The factor $K=\Delta f/\Delta f_{RA}$ accounts for the difference in subcarrier spacing between the random access preamble and uplink data transmission. The variable $\Delta f_{RA}$, the subcarrier spacing for the random access preamble, and the variable φ, a fixed offset determining the frequency-domain location of the random access preamble within the physical resource blocks, are both given by the following table.

TABLE 7

| Preamble format | $\Delta f_{RA}$ | $\varphi$ |
|---|---|---|
| 0~3 | 1250 Hz | 7 |
| 4 | 7500 Hz | 2 |

In the LTE/LTE-A system, a subcarrier spacing Δf is 15 kHz or 7.5 kHz. However, as given by Table 7, a subcarrier spacing $\Delta f_{RA}$ for a random access preamble is 1.25 kHz or 0.75 kHz.

As more communication devices have demanded higher communication capacity, there has been necessity of enhanced mobile broadband relative to legacy radio access technology (RAT). In addition, massive machine type communication for providing various services irrespective of time and place by connecting a plurality of devices and objects to each other is one main issue to be considered in future-generation communication. Further, a communication system design in which services/UEs sensitive to reliability and latency are considered is under discussion. The introduction of future-generation RAT has been discussed by taking into consideration enhanced mobile broadband communication, massive MTC, ultra-reliable and low-latency communication (URLLC), and the like. In current 3GPP, a study of the future-generation mobile communication system after EPC is being conducted. In the present invention, the corresponding technology is referred to as a new RAT (NR) or 5G RAT, for convenience.

An NR communication system demands that much better performance than a legacy fourth generation (4G) system be supported in terms of data rate, capacity, latency, energy consumption, and cost. Accordingly, the NR system needs to make progress in terms of bandwidth, spectrum, energy, signaling efficiency, and cost per bit.

<OFDM Numerology>

The new RAT system uses an OFDM transmission scheme or a similar transmission scheme. For example, the new RAT system may follow the OFDM parameters defined in the following table. Alternatively, the new RAT system may conform to numerology of the legacy LTE/LTE-A system but may have a broader system bandwidth (e.g., 100 MHz) than the legacy LTE/LTE-A system. One cell may support a plurality of numerologies. That is, UEs that operate with different numerologies may coexist within one cell.

<Subframe Structure>

In the 3GPP LTE/LTE-A system, radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15\text{ kHz})$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like. The TTI refers to an interval during which data can be scheduled. For example, in a current LTE/LTE-A system, a transmission opportunity of a UL grant or a DL grant is present every 1 ms and several transmission opportunities of the UL/DL grant are not present within a shorter time than 1 ms. Therefore, the TTI in the legacy LTE/LTE-A system is 1 ms.

Figure 2:
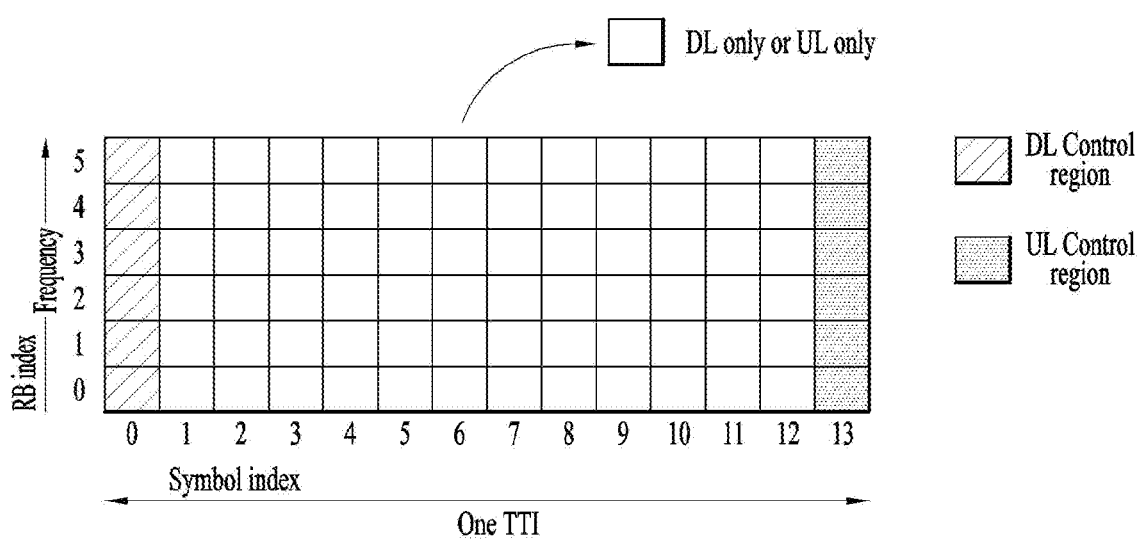
FIG. 2 illustrates a subframe structure available in a new radio access technology (NR).

FIG. 2 illustrates a subframe structure available in a new radio access technology (NR).

To minimize data transmission latency, in a 5G new RAT, a subframe structure in which a control channel and a data channel are time-division-multiplexed is considered.

In FIG. 2, the hatched area represents the transmission region of a DL control channel (e.g., PDCCH) carrying the DCI, and the black area represents the transmission region of a UL control channel (e.g., PUCCH) carrying the UCI. Here, the DCI is control information that the gNB transmits to the UE. The DCI may include information on cell configuration that the UE should know, DL specific information such as DL scheduling, and UL specific information such as UL grant. The UCI is control information that the UE transmits to the gNB. The UCI may include a HARQ ACK/NACK report on the DL data, a CSI report on the DL channel status, and a scheduling request (SR).

In FIG. 2, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the subframe structure of FIG. 2, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a subframe structure, a time gap is needed for the process of switching from the transmission mode to the reception mode or from the reception mode to the transmission mode of the gNB and UE. On behalf of the process of switching between the transmission mode and the reception mode, some OFDM symbols at the time of switching from DL to UL in the subframe structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present invention, the DL control channel may be locally transmitted or distributively transmitted in a partial frequency band in a system band, i.e., a channel band.

In an NR system, a basic transmission unit is a slot. A slot duration corresponds to 14 symbols for a normal cyclic prefix (CP) and 12 symbols for an extended CP. The slot duration is scaled in time as a function of a used subcarrier spacing.

In the NR system, a scheduler allocates a radio resource in units of a TTI. In the NR system, the TTI corresponds to one mini-slot, one slot, or a plurality of slots.

<Analog Beamforming>

In the millimeter wave (mmW) band, the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ. (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. In the analog beamforming method, multiple antenna elements are mapped to one TXRU and a beam direction is adjusted using an analog phase shifter. This analog beamforming method may only make one beam direction in the whole band, and thus may not perform frequency selective beamforming (BF), which is disadvantageous.

The hybrid BF method which is an intermediate type of digital BF and analog BF and uses B TXRUs less in number than Q antenna elements may be considered. In the case of hybrid BF, the number of directions in which beams may be transmitted at the same time is limited to B or less, which depends on the method of collection of B TXRUs and Q antenna elements.

<Hybrid Analog Beamforming>

Figure 3:
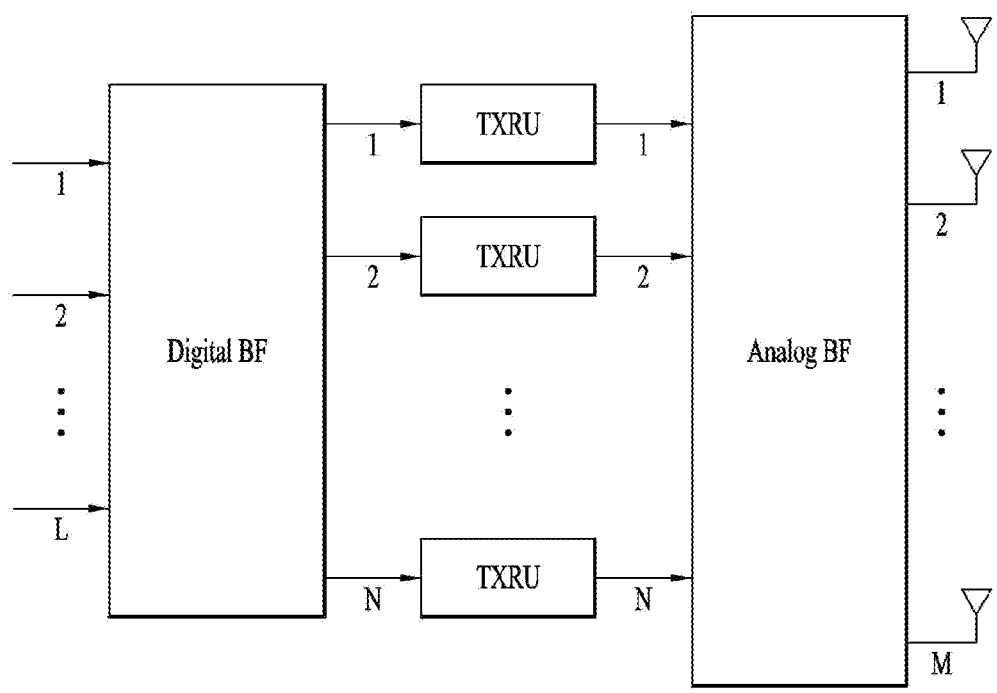
FIG. 3 abstractly illustrates transceiver units (TXRUs) and a hybrid beamforming structure in terms of physical antennas.

FIG. 3 abstractly illustrates TXRUs and a hybrid BF structure in terms of physical antennas.

When a plurality of antennas is used, a hybrid BF method in which digital BF and analog BF are combined is considered. Analog BF (or RF BF) refers to an operation in which an RF unit performs precoding (or combining). In hybrid BF, each of a baseband unit and the RF unit (also referred to as a transceiver) performs precoding (or combining) so that performance approximating to digital BF can be obtained while the number of RF chains and the number of digital-to-analog (D/A) (or analog-to-digital (A/D)) converters is reduced. For convenience, the hybrid BF structure may be expressed as N TXRUs and M physical antennas. Digital BF for L data layers to be transmitted by a transmitter may be expressed as an N-by-L matrix. Next, N converted digital signals are converted into analog signals through the TXRUs and analog BF expressed as an M-by-N matrix is applied to the analog signals. In FIG. 3, the number of digital beams is L and the number of analog beams is N. In the NR system, the BS is designed so as to change analog BF in units of symbols and efficient BF support for a UE located in a specific region is considered. If the N TXRUs and the M RF antennas are defined as one antenna panel, the NR system considers even a method of introducing plural antenna panels to which independent hybrid BF is applicable. In this way, when the BS uses a plurality of analog beams, since which analog beam is favorable for signal reception may differ according to each UE, a beam sweeping operation is considered so that, for at least a synchronization signal, system information, and paging, all UEs may have reception opportunities by changing a plurality of analog beams, that the BS is to apply, according to symbols in a subframe.

Figure 4:
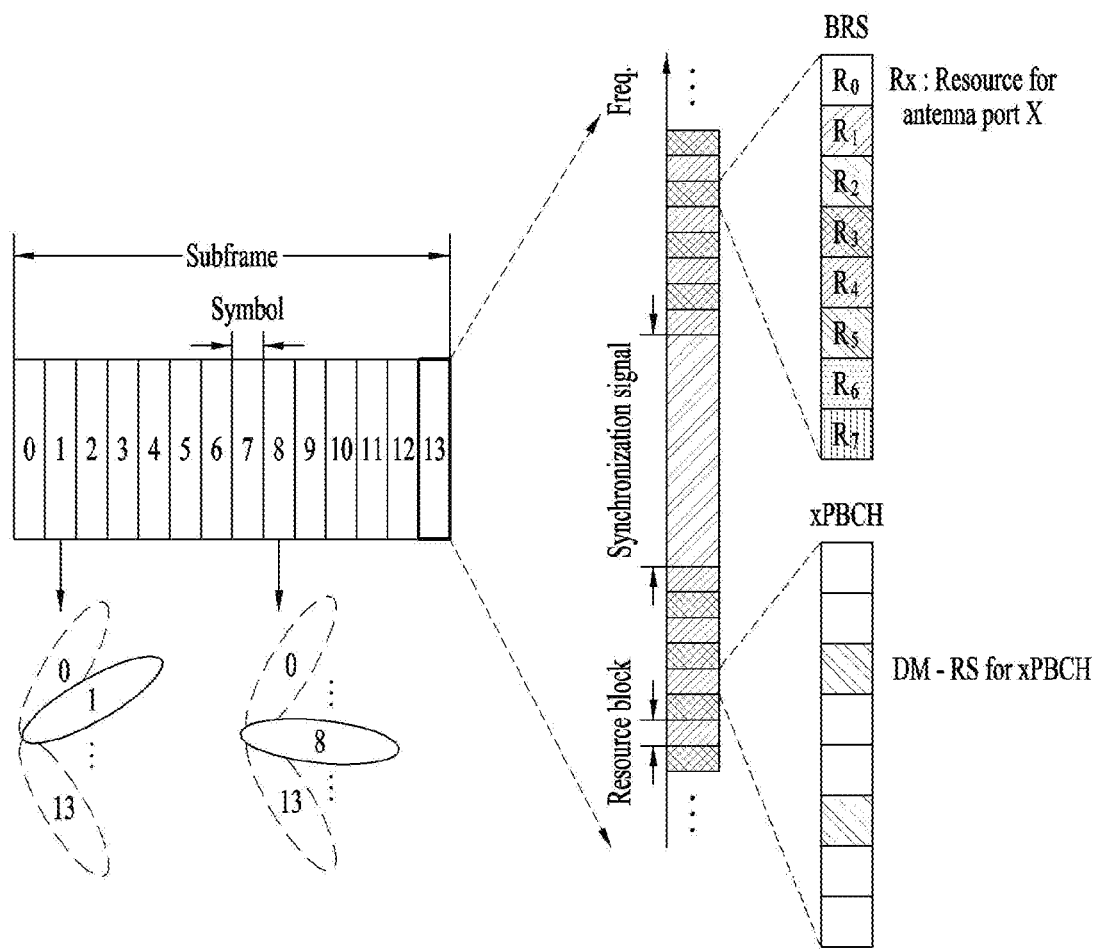
FIG. 4 illustrates a beam sweeping operation for a synchronization signal and system information in a downlink (DL) transmission procedure.

FIG. 4 illustrates a beam sweeping operation for a synchronization signal and system information in a downlink (DL) transmission procedure. In FIG. 4, a physical resource (or a physical channel) on which the system information of the NR system is transmitted in a broadcasting manner is referred to as an xPBCH. In this case, analog beams belonging to different antenna panels may be simultaneously transmitted within one symbol. In order to measure a channel for each analog beam, a method of introducing a beam reference signal (BRS), which is a reference signal (RS) transmitted by applying a single analog beam (corresponding to a specific antenna panel) as illustrated in FIG. 4, is being discussed. The BRS may be defined for a plurality of antenna ports and each antenna port of the BRS may correspond to a single analog beam. Unlike the BRS, the synchronization signal or the xPBCH may be transmitted by applying all analog beams in an analog beam group such that any UE may receive the synchronization signal or the xPBCH well.

Recently, a 3GPP standardization organization is considering network slicing to achieve a plurality of logical networks in a single physical network in a new RAT system, i.e., the NR system, which is a 5G wireless communication system. The logical networks should be capable of supporting various services (e.g., eMBB, mMTC, URLLC, etc.) having various requirements. A physical layer system of the NR system considers a method supporting an orthogonal frequency division multiplexing (OFDM) scheme using variable numerologies according to various services. In other words, the NR system may consider the OFDM scheme (or multiple access scheme) using independent numerologies in respective time and frequency resource regions.

Recently, as data traffic remarkably increases with appearance of smartphone devices, the NR system needs to support of higher communication capacity (e.g., data throughput). One method considered to raise the communication capacity is to transmit data using a plurality of transmission (or reception) antennas. If digital BF is desired to be applied to the multiple antennas, each antenna requires an RF chain (e.g., a chain consisting of RF elements such as a power amplifier and a down converter) and a D/A or A/D converter. This structure increases hardware complexity and consumes high power which may not be practical. Accordingly, when multiple antennas are used, the NR system considers the above-mentioned hybrid BF method in which digital BF and analog BF are combined.

Figure 5:
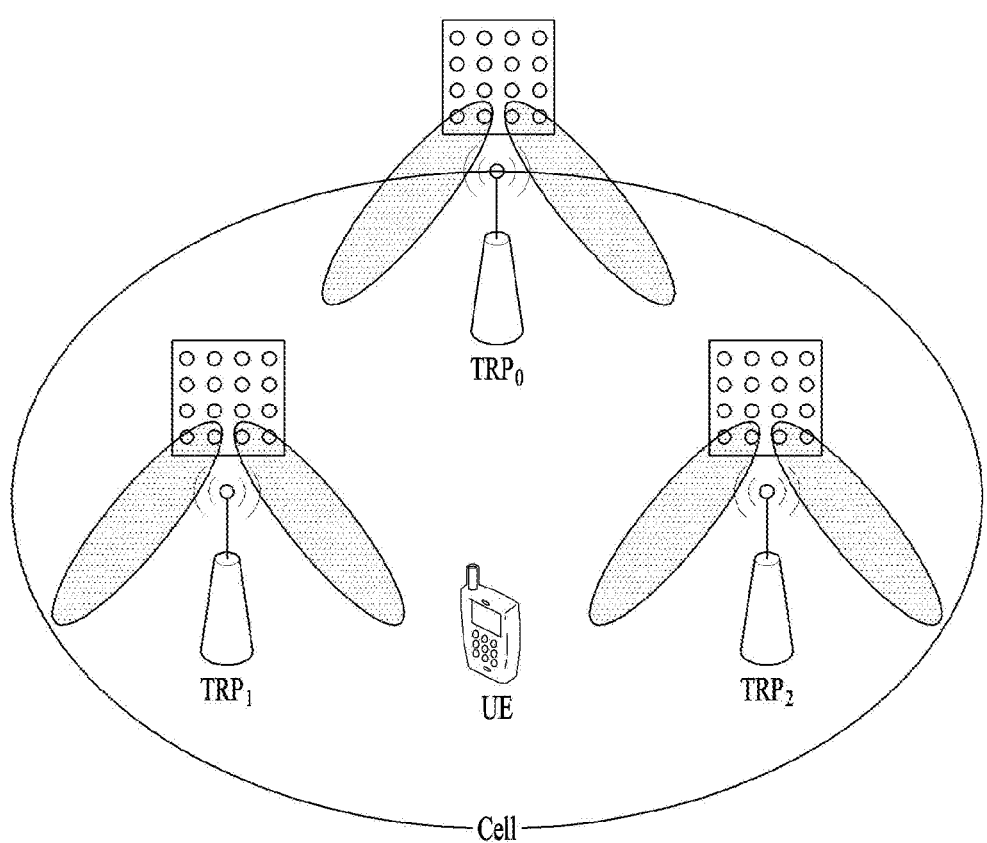
FIG. 5 illustrates a cell of a new radio access technology (NR) system.

FIG. 5 illustrates a cell of a new radio access technology (NR) system.

Referring to FIG. 5, in the NR system, a method in which a plurality of transmission and reception points (TRPs) form one cell is being discussed unlike a wireless communication system of legacy LTE in which one BS forms one cell. If the plural TRPs form one cell, seamless communication can be provided even when a TRP that provides a service to a UE is changed so that mobility management of the UE is facilitated.

In an LTE/LTE-A system, a PSS/SSS is transmitted omni-directionally. Meanwhile, a method is considered in which a gNB which uses millimeter wave (mmWave) transmits a signal such as a PSS/SSS/PBCH through BF while sweeping beam directions omni-directionally. Transmission/reception of a signal while sweeping beam directions is referred to as beam sweeping or beam scanning. For example, assuming that the gNB may have a maximum of N beam directions, the gNB transmits a signal such as a PSS/SSS/PBCH in each of the N beam directions. That is, the gNB transmits a synchronization signal such as the PSS/SSS/PBCH in each direction while sweeping directions that the gNB can have or the gNB desires to support. Alternatively, when the gNB can form N beams, one beam group may be configured by grouping a few beams and the PSS/SSS/PBCH may be transmitted/received with respect to each beam group. In this case, one beam group includes one or more beams. The signal such as the PSS/SSS/PBCH transmitted in the same direction may be defined as one synchronization (SS) block and a plurality of SS blocks may be present in one cell. When the plural SS blocks are present, SS block indexes may be used to distinguish between the SS blocks. For example, if the PSS/SSS/PBCH is transmitted in 10 beam directions in one system, the PSS/SSS/PBCH transmitted in the same direction may constitute one SS block and it may be understood that 10 SS blocks are present in the system. In the present invention, a beam index may be interpreted as an SS block index.

<RACH Preamble Sequence in NR System>

Relative to an RACH preamble used in a legacy LTE/LTE-A system, an RACH preamble to be used in an NR system should be designed by further taking into account some considerations.

First, the NR system supports a higher frequency band than the LTE system. That is, the LTE system supports up to a band of 3.5 GHz, whereas the NR system supports a band of 3.5 GHz to 6 GHz and a band of 6 GHz or more. As a frequency band supported by a wireless communication system becomes higher, an error occurring in a carrier frequency of the UE increases. In addition, while a maximum UE speed that the NR system desires to support is 500 km/hour, a Doppler frequency offset observed by the gNB with respect to the UE of 500 km/hour is about 2 kHz or more. If an NR random access preamble is designed to operate using a subcarrier spacing of 1.25 kHz which is equally used in an LTE random access preamble, RACH preamble reception performance in the gNB may be remarkably deteriorated or the RACH preamble may not be received at all at an accurate timing position, due to the frequency error occurring in the carrier frequency of the UE and the Doppler frequency offset occurring in a channel as mentioned above.

Second, although the NR system supports, like the LTE system, TDD as well as FDD, especially the NR system has a high possibility of using TDD as a basic operation mode in a millimeter wave band of 6 GHz or more. Similarly to the example illustrated in FIG. 2, a basic frame format of TDD in the NR system, which has been discussed, is configured as DL control signal+UL or DL data+UL control signal within one slot. In consideration of a frame format having a high possibility of being used in the NR system, necessity of defining an RACH preamble format in which the length of an RACH preamble is smaller than a remaining region except for DL and UL control signal regions from a basic frame (e.g., slot) is proposed.

Third, the LTE system defines an RACH procedure as a 4-step operation and the NR system also tries to define the same procedure as the RACH procedure of the LTE system as a basic procedure. However, for a specific service, the UE aims at maximally reducing latency consumed to access a system and latency needed to receive data. To this end, the RACH procedure designed as two steps is considered for the specific service. In the 2-step RACH procedure, transmission of an RACH preamble and transmission of an RACH message occur successively. In this case, if the RACH preamble is too long, the length of an RACH including the RACH preamble and the RACH message becomes very long and, thus, transmission of the RACH may always occupy a plurality of slots.

Considering these problems, it is necessary to define the length of the RACH preamble in the NR system to be shorter than the RACH preamble in the LTE system. For example, although the length of an RACH preamble sequence in the LTE system is about 800 µs, a sequence of a short length such as about 66.6 µs or 133.3 µs may be defined as a basic unit of the RACH preamble in the NR system. Since the sequence of such a short length is small in a supportable cell radius, an RACH preamble format where the sequence defined as the basic unit is repeated several times may be additionally defined in order to enlarge the supportable cell radius. For example, RACH preamble formats may be defined as follows.

TABLE 8

| Preamble format | Subcarrier spacing $\Delta f_{RA}$ [kHz] | OFDM duration $T_{SEQ} = 1/F_{RA}$ [ms] | # of repetitions of PRACH OFDM symbol | Preamble length [ms] | # of subframes | CP duration $T_{CP}$ [$T_s$] | Total length [ms] | Guard time $T_{GT}$ [$T_s$] |
|---|---|---|---|---|---|---|---|---|
| #1-1 | 1.25 | 0.8 | 1 | 0.8 | 1 | 3328 | 1 | 2816 |
| #1-2 | 1.25 | 0.8 | 2 | 1.6 | 2 | 6400 | 2 | 5888 |
| #1-3 | 1.25 | 0.8 | 3 | 2.4 | 3 | 9472 | 3 | 8960 |
| #1-4 | 1.25 | 0.8 | 1 | 0.8 | 2 | 18688 | 2 | 18176 |
| #1-5 | 1.25 | 0.8 | 2 | 1.6 | 3 | 21760 | 3 | 21248 |
| #1-6 | 1.25 | 0.8 | | 0 | 0 | | 0 | |
| #2-1 | 2.5 | 0.4 | 2 | 0.8 | 1 | 3328 | 1 | 2816 |
| #2-2 | 2.5 | 0.4 | 4 | 1.6 | 2 | 6400 | 2 | 5888 |
| #2-3 | 2.5 | 0.4 | 6 | 2.4 | 3 | 9472 | 3 | 8960 |
| #2-4 | 2.5 | 0.4 | 2 | 0.8 | 2 | 18688 | 2 | 18176 |
| #2-5 | 2.5 | 0.4 | 4 | 1.6 | 3 | 21760 | 3 | 21248 |
| #2-6 | 2.5 | 0.4 | | 0 | 0 | | 0 | |
| #3-1 | 7.5 | 0.133333333 | 6 | 0.8 | 1 | 3328 | 1 | 2816 |
| #3-2 | 7.5 | 0.133333333 | 12 | 1.6 | 2 | 6400 | 2 | 5888 |
| #3-3 | 7.5 | 0.133333333 | 18 | 2.4 | 3 | 9472 | 3 | 8960 |
| #3-4 | 7.5 | 0.133333333 | 6 | 0.8 | 2 | 18688 | 2 | 18176 |
| #3-5 | 7.5 | 0.133333333 | 12 | 1.6 | 3 | 21760 | 3 | 21248 |
| #3-6 | 7.5 | 0.133333333 | | 0 | 0 | | 0 | |

In Table 8, a basic time unit $T_s=1/(\Delta f_{ref}*N_{f,ref})=3.255421*10^{-5}$, where $\Delta f_{ref}=15*10^3$ Hz and $N_{f,ref}=2048$.

In the case of a normal wireless communication system, a plurality of UEs uses one RACH resource. In this case, in order to prevent collision between the UEs and cause a BS to distinguishably detect the UEs, multiple sequences available for one RACH resource are defined. The LTE system uses sequences of a cyclic-shifted version, i.e., cyclic-shifted sequences, of a Zadoff-Chu (hereinafter, ZC) sequence used as a sequence for the RACH preamble, thereby preventing collision between the UEs. That is, the LTE system uses the ZC sequence having a length of 839 and uses a cyclic shift of a 13-sample unit (i.e., $N_{CS}=13$) with respect to a cell of the smallest radius, so that about 64 codes are generated and used for one ZC sequence.

However, as mentioned above, when a sequence of a short length is used for the RACH procedure in the NR system, the number of codes available for one ZC sequence is reduced. For example, for the RACH preamble using a subcarrier spacing of 7.5 kHz in a frequency band of 1.08 MHz, the length of a root sequence is 127 and, if the cyclic shift of a 13-sample unit is used, only about 9 codes may be used for one RACH resource. A semi-optimal method for solving this issue may consider a method of using an additional sequence having a low cross-correlation characteristic (e.g., a ZC sequence having a different root sequence index (hereinafter, a root index)) or a method of allocating more frequency resources for the RACH.

To overcome problems that may arise in the NR system in regard to the RACH procedure, the present invention proposes a method of increasing the number of optimal codes available for one RACH resource. Specifically, the present invention proposes using a repetition pattern of a short sequence and using a sinusoidal complex signal as an orthogonal cover for repetition of the sequence, upon generation of a preamble sequence for the RACH preamble of the NR system. A discrete Fourier transform vector may be used as an orthogonal code. In this case, the maximum number of sequences that can be obtained only using the orthogonal code for the short sequence according to the present invention may be equal to the number of repetitions of the short sequence. For reasons of using non-coherent combining for the RACH preamble in the gNB, the number of orthogonal codes may be limited and the gNB may inform the UE of related information (e.g., a repetition factor and an orthogonal limitation factor). The UE may generate or configure an RACH preamble resource set using the repetition factor and the orthogonal cover (OC) limitation factor. Hereinafter, proposals of the present invention will be described in detail.

* Repetition Pattern of RACH Preamble Sequence

As mentioned previously, in the NR system, a sequence of a short length may be defined for an RACH preamble for reasons of 1) an increased frequency error, 2) a shortened slot length, and 3) successive transmission of an RACH message. In this way, since the sequence defined to be short is small in signal energy relative to a sequence of a long length, supportable cell coverage is reduced. To solve this problem, it is considered that the sequence of a short length is repeatedly transmitted to satisfy desired cell coverage.

Figure 6:
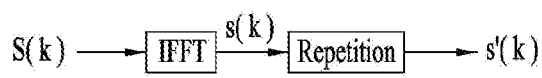
FIG. 6 conceptually illustrates two methods of repeating a signal by a transmission device.
Figure 6:
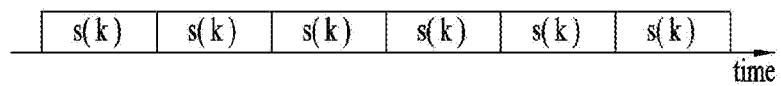
Figure 6:
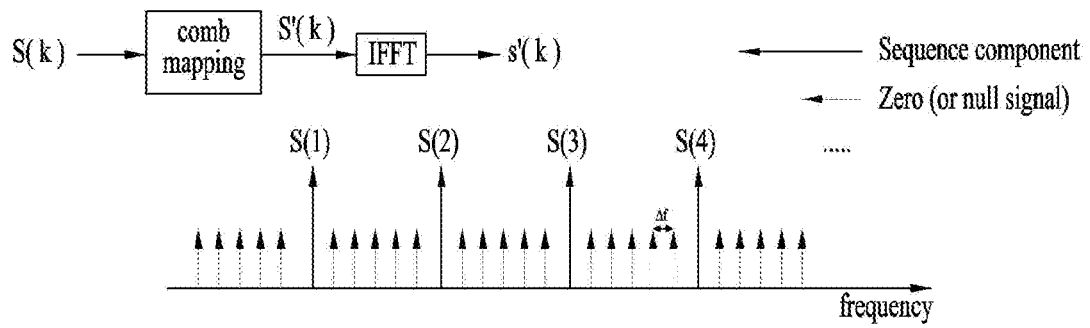

FIG. 6 conceptually illustrates two methods of repeating a signal by a transmission device. If it is desired to repeatedly transmit a certain sequence in an OFDM system, the transmission device may generate a signal using one of the two methods described below.

(1) As illustrated in FIG. 6(a), a signal s(k) is generated from an input signal S(k) (where k is a sequence index) using IFFT of a small size and then a signal s'(k) is generated by repeatedly connecting the signal s(k).

(2) As illustrated in FIG. 6(b), a signal s'(k) is generated using IFFT of a large size with respect to a signal S'(k) obtained by comb-type mapping for an input signal S(k) on the frequency axis. Herein, comb-type mapping refers to a resource mapping method of mapping symbols constituting a signal at a spacing of a predetermined number of subcarriers rather than at a spacing of every subcarrier. For example, if comb-type mapping should be performed in every two subcarriers with respect to subcarriers 0, 1, 2, 3, 4, . . . , the transmission device maps a signal only to subcarriers 2m' (where m'=-0, 1, 2, 3, . . . ) or subcarriers 2m'+1 (where m'=0, 1, 2, . . . ).

The device may generate repeated sequences using the method illustrated in FIG. 6(a) or 6(b) with respect to a base sequence for an RACH. The signal generated in this way is generated as the RACH preamble sequence cyclic-shifted on the time axis through cyclic shift of an amount defined as an RACH resource (e.g., an integer multiple of $N_{CS}$). The RACH preamble is configured using the generated RACH preamble sequence. For example, the RACH preamble may consist of cyclic prefix (CP)+RACH preamble sequence+ guard time (GT).

Figure 7:
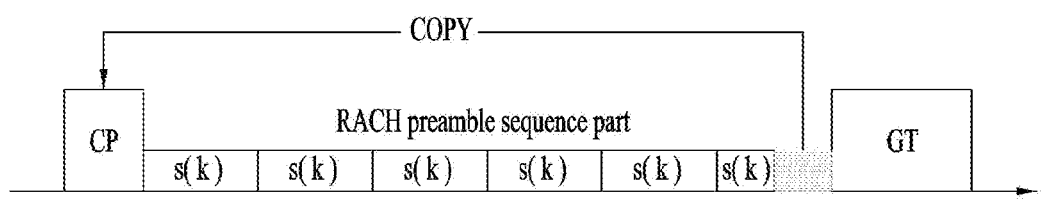
FIG. 7 illustrates a format of an RACH preamble using a repeated RACH preamble sequence.

FIG. 7 illustrates a format of an RACH preamble using a repeated RACH preamble sequence. In FIG. 7, s(k) denotes a preamble sequence for an RACH.

In the RACH preamble, the length of a CP and a GT is associated with a cell radius covered by the gNB. Generally, as the cell radius increases, the length of the CP and the GT becomes longer. If the number of repetitions of the sequence increases, this generally means that the cell radius increases. Therefore, if the number of repetitions of the sequence increases, the length of the CP and the GT may be longer. However, in the case of beam sweeping in a millimeter wave band, in which the transmission device transmits the sequence while sweeping a beam direction and a reception device attempts to receive the sequence by an individual beam, an environment in which the length of the CP or the GP does not become longer may be present even if the RACH preamble sequence becomes longer. In this case, the CP may be generated by copying the last part of the RACH preamble sequence using the same method as a general method used in the OFDM system. Therefore, when the length of the CP is very long, a base sequence may repeatedly appear during a CP duration. In the case of the GT, although the length of the GT is defined, the UE does not transmit any signal during a GT duration. Accordingly, after transmitting the RACH preamble sequence, since the UE merely stops transmitting during the GT duration, an additional signal and operation may not be defined for the GT.

As mentioned above, when repetition of the short sequence is used as a preamble sequence part, since the number of cyclic-shifted versions decreases due to characteristics of the short sequence, the number of sequences for an optimal RACH preamble available to the UE is reduced. To solve this problem, the present invention proposes that the number of preamble sequences for an RACH procedure be extended using the following methods.

* Method of Generating RACH Preamble Sequence Part

The present invention proposes generating orthogonal covered base sequences by applying orthogonal covers to a base sequence. In the present invention, the base sequence may be a root sequence or a sequence obtained by cyclic-shifting the root sequence. If N orthogonal covers according to the present invention are applied to the base sequence, orthogonal covered base sequences of N versions may be obtained. Particularly, the present invention proposes that an orthogonal cover signal according to Method I or Method II be applied to the base sequence.

1-1) Method I. Method of Generating an Orthogonal Cover Sequence for a Repetition Pattern of an RACH Preamble Sequence: Use of a Sinusoidal Complex Signal To increase the number of RACH preamble sequences, the present invention proposes using an additional sinusoidal complex signal as an orthogonal cover with respect to a signal generated through repetition. That is, a sinusoidal signal having a complex value as a parameter is applied to the preamble sequence part. In this case, a frequency of the sinusoidal complex signal used as the orthogonal cover is $n*\Delta f$, where $\Delta f=1/T_{RACH}$, n is an integer 0, 1, . . . , $N_{rep}-1$, $T_{RACH}$ denotes the length of the RACH preamble sequence part, and $N_{rep}$ denotes the number of repetitions of the base sequence. The sinusoidal complex signal may be called a sinusoidal signal, a frequency of which is j*n*Δf, using an imaginary unit j. For example, if the base sequence is repeated six times with respect to an RACH preamble length of 800 μs, then Δf=1.25 kHz and orthogonal cover signals or orthogonal covered preamble sequences may be configured using n=0, . . . , 5. Herein, n represents a resource index for distinguishing between orthogonal cover signals/sequences or a resource index for distinguishing between the preamble sequences additionally generated by the orthogonal cover signals/sequences, according to the present invention. If n=0, . . . , 5, since 6 orthogonal covered sequences may be generated from the same base sequence, an effect of increasing the size of an RACH preamble sequence resource pool which can be selected by the UE may be acquired.

Figure 8:
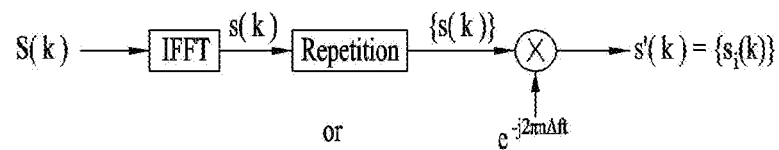
FIG. 8 illustrates a method of generating an RACH preamble sequence according to the present invention.
Figure 8:
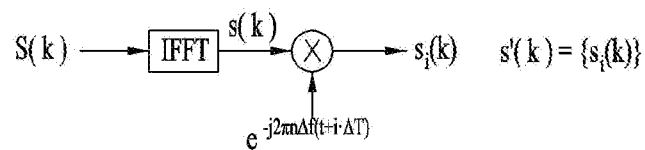
Figure 8:
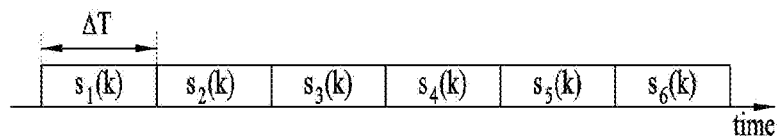
Figure 8:
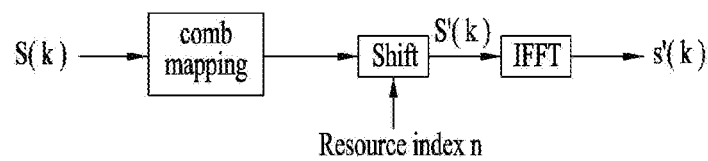
Figure 8:
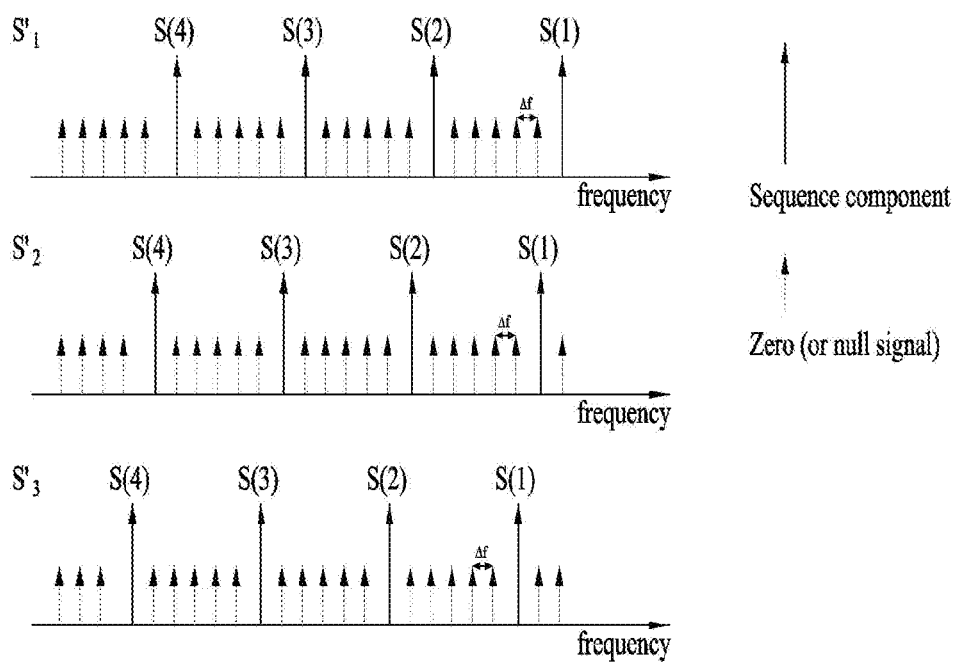

FIG. 8 illustrates a method of generating an RACH preamble sequence according to the present invention. In FIG. 8, ΔT denotes a sequence duration of a base sequence s(k), Δf=/$T_{RACH}$=1/(N*ΔT), N denotes the number $N_{rep}$ of repetitions of the base sequence in an RACH preamble, n denotes a resource index, and $s_i(k)$ denotes an i-th sequence (i=1, . . . , N or i=0, . . . , N−1) among N repeated sequences.

If the base sequence is defined and the number of repetitions of the base sequence is given, the base sequence may be simply repeated in the time domain (as illustrated in FIG. 6(a)) or in the frequency domain (as illustrated in FIG. 6(b)), in the absence of an orthogonal cover. In the present invention, an orthogonal cover of a sinusoidal form is additionally applied to a preamble sequence part including repetition of the sequence. The present invention may be implemented on the time axis or the frequency axis. The present invention may be applied on the time axis or the frequency axis.

The present invention may be implemented on the time axis as illustrated in FIG. 8(a). Referring to FIG. 8(a), the UE may repeat the base sequence s(k) on the time axis and generate an RACH preamble sequence s'(k) by multiplying a signal (e.g., $e^{-j2\pi n\Delta f t}$) defined as an orthogonal cover by a repeated base sequence {s(k)}. As a similar method, without generating a long signal obtained by repeating the base sequence on the time axis, the UE may store the short signal s(k), configure an initial phase suitable for an order in which each base sequence occurs in the preamble sequence in a process of generating the orthogonal cover, and then generate signals $s_i(k)$ by multiplying the orthogonal cover (e.g., $e^{-j2\pi n\Delta f(t+i*\Delta T)}$, i=1, . . . , N or $e^{-j2\pi n\Delta f(t+i*\Delta T)}$, i=0, . . . , N−1) by the base sequence. That is, if an RACH preamble format should include the base sequence s(k) N times, an i-th sequence $s_i(k)$ to be included in the RACH preamble may be obtained by multiplying $e^{-j2\pi n\Delta f(t+i*\Delta T)}$ by an i-th base sequence s(k) among the base sequences repeated N times. In $e^{-j2\pi n\Delta f t}$ and $e^{-j2\pi n\Delta f(t+i*\Delta T)}$, t denotes time. In this case, a cyclic shift for a root sequence or the base sequence may be applied to any of a middle stage or a final stage. For example, the cyclic shift may be applied in the form in which the base sequence is phase-shifted in the frequency domain or the cyclic shift may be applied in the form in which a preamble sequence signal obtained after IFFT is cyclic-shifted in the time domain.

The present invention may be implemented on the frequency axis as illustrated in FIG. 8(b). Referring to FIG. 8(b), the UE may perform comb-type mapping upon a frequency-axis signal of a base sequence on the frequency axis according to a frequency location determined based on RACH preamble resource information and then generate a signal s'(k) by applying inverse discrete Fourier transform (IDFT) or inverse fast Fourier transform (IFFT). For example, as illustrated in FIG. 8(b), when the number N of repetitions is 6, the number of frequency locations to which the frequency-axis signal of the base sequence may be mapped is 6 and the frequency-axis signal is mapped to one of the 6 frequency locations along resource indexes n (n=0, . . . , N−1). That is, in the present invention, comb-type mapping is performed upon the base sequence at a frequency spacing of N*Δf and a frequency-domain starting location of the base sequence is changed using n. Referring to FIG. 8(b), symbols constituting the base sequence are mapped in the frequency domain at a spacing of 6*Δf and signals S'(k) having different frequency-domain starting locations according to resource indexes n are obtained (refer to frequency locations of S', of FIG. 8(b), i.e., $S'_1$, $S'_2$, and $S'_3$). For example, if n=0, the symbols of the base sequence are started from 0*Δf and are mapped to every 6*Δf. If n=1, the symbols of the base sequence are started from 1*Δf and are mapped to every 6*Δf. If n=2, the symbols of the base sequence are started from 2*Δf and are mapped to every 6*Δf. In the present invention, a cyclic shift for the sequence may be implemented such that the cyclic shift is applied to the final signal s'(k) in the time domain or phase rotation corresponding to the cyclic shift in the frequency domain is applied to each subcarrier.

The UE may insert a CP to a front part of the RACH preamble sequence part and includes the RACH preamble sequence s'(k) in the RACH preamble sequence part, thereby generating the RACH preamble. The RACH preamble is finally transmitted via an antenna after a modulation process.

According to the present invention, when an RACH resource sequence of the above structure is defined, the maximum number of added resources may increase by a multiple of the number of repetitions. For example, if the preamble sequence part is configured by repeating the base sequence having a root index of 127 six times and a basic unit $N_{CS}$ of a cyclic shift is set to 13 in an environment in which a system operates, for example, according to coverage of the gNB, the number of RACH preamble sequences capable of being generated using one root sequence and a cyclic shift is 9 (=floor(127/13)). If the orthogonal cover proposed in the present invention is used, 54 (=9*6) RACH preamble sequences may be obtained from one root sequence. The UE may transmit one of the 54 RACH preamble sequences to the gNB.

Figure 9:
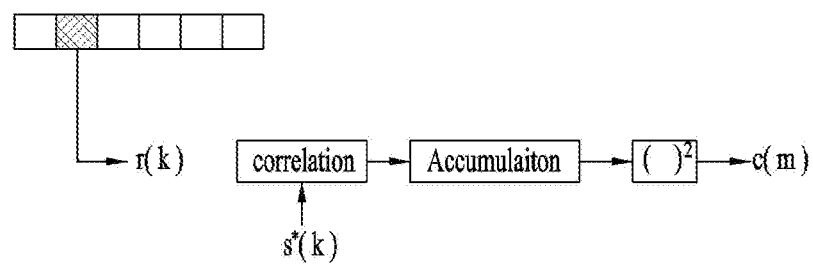
FIG. 9 illustrates the structure of a receiver for receiving an RACH preamble according to a method of the present invention.
Figure 9:
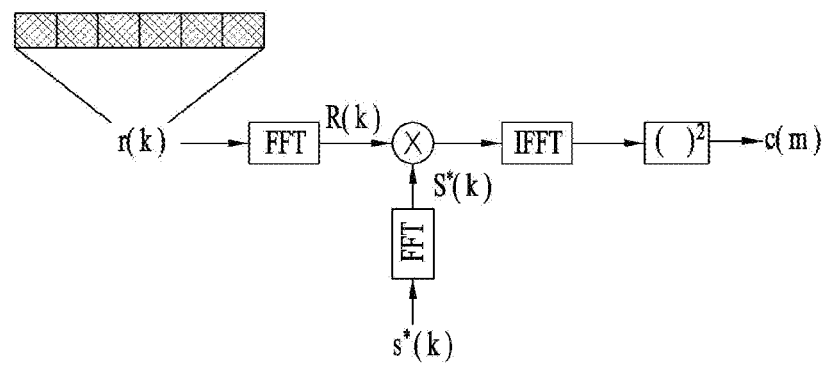

FIG. 9 illustrates the structure of a receiver for receiving an RACH preamble according to a method of the present invention. FIG. 9(a) illustrates RACH signal processing on the time axis and FIG. 9(b) illustrates RACH signal processing on the frequency axis.

To interpret orthogonality between RACH preamble sequences obtained according to the present invention in terms of the frequency axis, reference is made to the structure of the receiver of FIG. 9. FIG. 9(b) illustrates an implementation scheme of the receiver for the RACH preamble on the frequency axis according to the present invention. Referring to FIG. 9(b), the receiver properly selects a signal r(k) to be used to detect the RACH preamble from a reception signal and performs discrete Fourier transform (DFT) or fast Fourier transform (FFT) upon the signal r(k), so that the reception signal r(k) on the time axis appears as a reception signal R(k) on the frequency axis. The receiver multiplies the reception signal R(k) appearing (expressed) on the frequency axis by a conjugate of a (frequency-axis) sequence agreed on to be used as a transmission signal and then performs IDFT or IFFT, thereby obtaining a signal c(m) correlated with the signal r(k) received by the receiver on the time axis. In this case, a cyclic shift value of a signal may be obtained from a location at which it is determined that a correlation value is present, for example, a location at which a signal having high strength is received. In consideration of such a structure of the receiver, since $S'_1$ and $S'_2$ are present at different locations on the frequency axis as illustrated in FIG. 8(b), if the reception device tries to receive $S'_2$ when the transmission device transmits $S'_1$, a signal obtained by multiplying the reception signal R(k) of $S'_1$ on the frequency axis by a conjugate of $S'_2$ appears as a signal approximating to 0. That is, it is appreciated that signals having different resource indexes n have orthogonality. This means that signals having different resource indexes on the time axis become sinusoidal signals having orthogonality.

According to Method I, continuity of base sequences to which an orthogonal cover is applied in the RACH preamble is maintained. That is, according to Method I, discontinuity between orthogonal covered base sequences does not occur even when the orthogonal cover is applied to the preamble part. Therefore, unlike Method II described later, the RACH preamble may be transmitted to the gNB without distortion even if the CP is not inserted between repetitions of the orthogonal covered base sequences.

1-2) Method II. Method of Generating an Orthogonal Cover Sequence for a Repetition Pattern of an RACH Preamble Sequence: Use of a DFT Vector Method I increases the number of (sequence) resources for the RACH preamble by applying the sinusoidal complex signal to whole repeated signals. Unlike Method I, a method of using the orthogonal cover in units of a repeated sequence individual block may be used. The present invention proposes Method II using a DFT vector as the orthogonal cover. The DFT vector may be represented by the following equation as already known.

$$\exp\left\{-j\left(\frac{2\pi \cdot i \cdot n}{N} + \theta\right)\right\} \quad \text{Equation 7}$$

where N denotes the number of repetitions of a sequence in an RACH preamble format and n denotes an index for an orthogonal cover used to distinguish between sequence resources. That is, n represents an index of the orthogonal cover applied to the preamble sequence part according to the present invention. In addition, i represents an index of an individual short sequence block within a preamble sequence part consisting of repeated base sequences and θ represents any phase. For example, when the RACH preamble includes base sequences s(k) repeated N times, the index i=0, . . . , N−1 or i=1, . . . , N may be sequentially assigned to first s(k) to N-th s(k), where $s_i(k)$ represents i-th s(k) among s(k) repeated 6 times within the RACH preamble.

Figure 10:
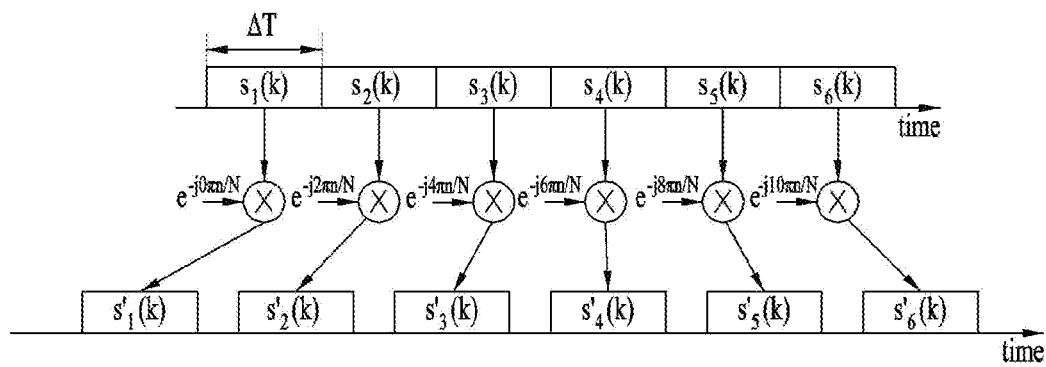
FIG. 10 illustrates another method of generating an RACH preamble sequence according to the present invention.
Figure 10:
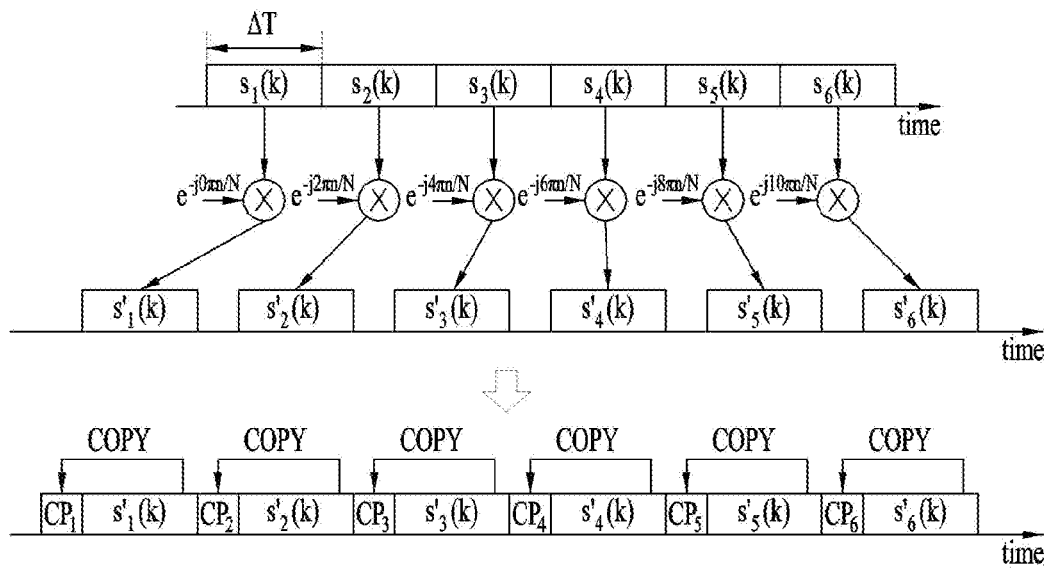

FIG. 10 illustrates another method of generating an RACH preamble sequence according to the present invention. In FIG. 10, the number N of repetitions is 6. Particularly, FIG. 10 illustrates a method of generating the RACH preamble sequence by applying an orthogonal cover using a DFT matrix.

Referring to FIG. 10, when the DFT vector is used as the orthogonal cover, the transmission device generates a base sequence and rotates each base sequence block $s_i(k)$ by phase defined as the DFT vector (e.g., in the form of multiplying $e^{-j*2i*\pi n/N}$ by $s_i(k)$, where i=0, . . . , N−1) as the base sequence is repeated, thereby generating an RACH preamble sequence part. The transmission device generates an RACH preamble by inserting the CP to the front part of the RACH preamble sequence part as described with reference to FIG. 7. The RACH preamble is finally transmitted through an antenna of the transmission device after a modulation process. However, when the DFT vector is used as the orthogonal cover, since discontinuous points are generated at points at which the sequence for the RACH preamble is repeated as illustrated in FIG. 10(b), RACH reception performance may be deteriorated. To prevent this phenomenon, the CP may be inserted between repeated sequences. In this case, the CP may be configured using a sequence with which an orthogonal cover signal is covered (i.e., applied or multiplied) as illustrated in FIG. 10(b).

Upon receiving the RACH preamble including sequences covered with the DFT vector, the reception device takes correlation with respect to base sequences received in the RACH preamble in units of a base sequence, instead of performing correlation upon a total sequence, i.e., a total sequence part within the RACH preamble, reflects the phase defined as the DFT vector according to the number of repetitions into correlation values, and then combines the correlation values, thereby acquiring a final correlation value.

* Signaling Method 2-1) Signaling Method for Dynamic Operation of gNB

In the LTE system, in order for one BS to use 64 RACH preamble resources, i.e., 64 preamble sequences, an RACH preamble resource set is configured by a combination of root indexes (i.e., root sequences) of a ZC sequence used as a base sequence and cyclic shifts to be used by each ZC sequence. For example, if a length-839 ZC sequence is used as a root sequence and 26 is used as a basic unit value of a cyclic shift, since 32 (=floor(839/26)) cyclic-shifted versions may be used for the ZC sequence, 64 RACH preamble resources may be obtained by using two root indexes as the RACH preamble resources. For example, if the BS informs the UE of two root indexes (i.e., root sequences) of {129, 710} as the RACH preamble resources, and $N_{CS}$=26, the UE defines or configures the preamble (sequence) resources using cyclic shift indexes 0 to 31 with respect to a ZC sequence having root index 129 and a ZC sequence having root index 710, randomly determines the preamble resources (i.e., preamble sequences) according to a predefined rule, and transmits an RACH carrying the preamble sequence.

If an RACH preamble sequence part has a structure configured by repetition of a short base sequence and an orthogonal cover which has been applied or which is applied to the RACH preamble sequence part is not present, the gNB should inform the UE of a repetition factor N in addition to a root index (i.e., root sequence) and a basic unit of a cyclic shift. For example, when a length-127 ZC sequence and $N_{CS}$=13 are used as an RACH sequence resource, since 9 cyclic shift versions may be used for one ZC sequence, the gNB informs UE(s) of 8 root indexes in order to define or configure 64 preamble resources (i.e., 64 preamble sequences). The gNB of the present invention informs the UE of the repetition factor N=6 in addition to 8 root indexes {129, 140, . . . } and $N_{CS}$=13.

In the structure of the RACH preamble resource proposed in the present invention, if an orthogonal cover considering the repetition factor of the RACH preamble is applied or multiplied, 9 cyclic-shifted versions may be used for one root index and 6 signals may be used as the orthogonal cover, with respect to a length-127 ZC sequence and $N_{CS}$=13. Therefore, the gNB informs the UE of two root indexes, rather than 8 root indexes, for example, root indexes {129, 140}, $N_{CS}$=13, and the repetition factor N=6 as RACH preamble (sequence) resource configuration information and the UE may select a resource to be used for RACH transmission from among RACH preamble (sequence) resources using the configuration information.

Herein, if UEs move at a high speed or frequency offsets of UEs greatly appear in an environment in which the gNB operates, a phase of an RACH preamble received by the gNB shows fast movement during an RACH preamble duration, which is the sum of a CP duration and a preamble sequence part duration. In this case, when the gNB performs correlation between a received signal during the RACH preamble duration and a preamble that the gNB desires to detect, coherent combining cannot be performed during a total time duration of the RACH preamble and, therefore, all orthogonal covers supportable by the gNB cannot always be used. These issues are described with reference to FIG. 11.

Figure 11:
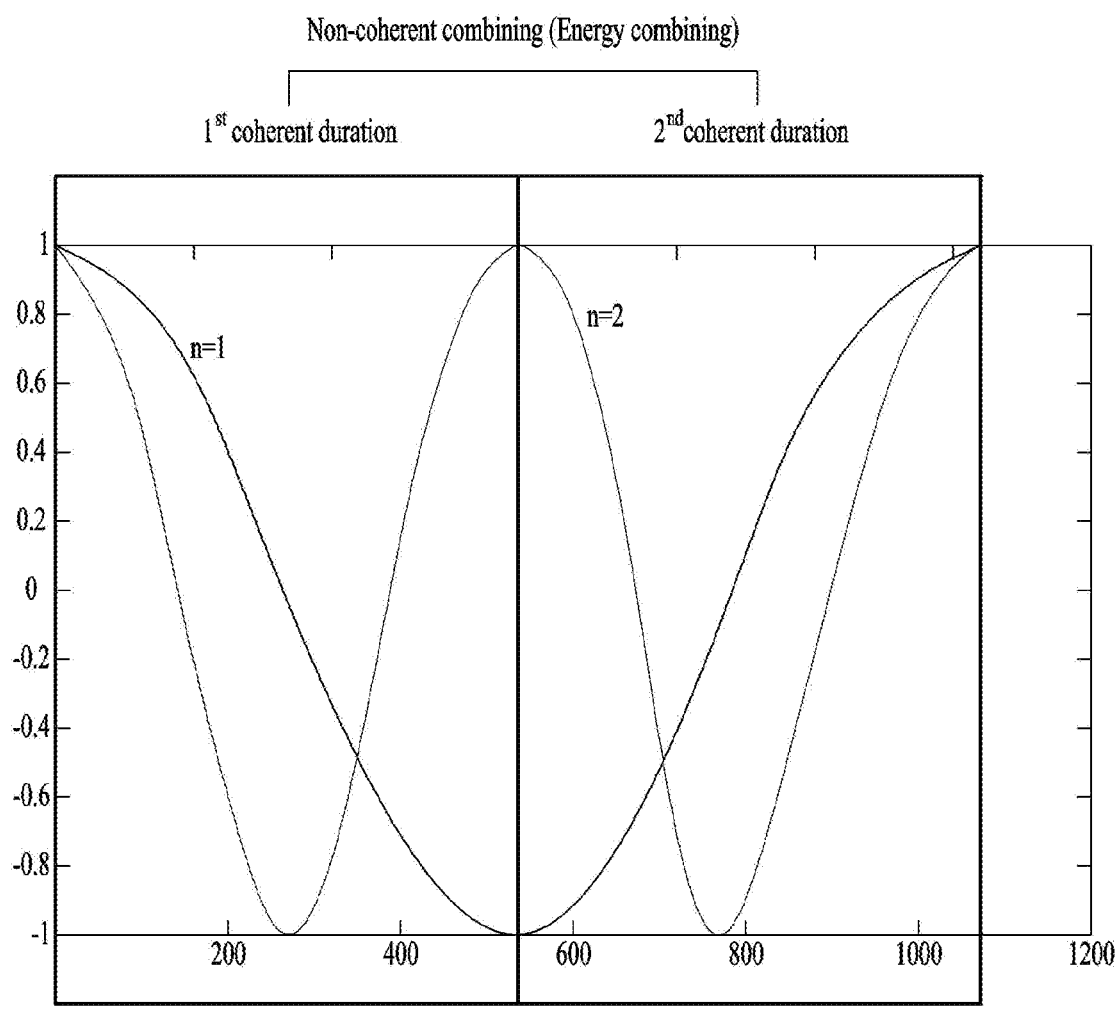
FIG. 11 illustrates coherent and non-coherent combining of an RACH preamble.

FIG. 11 illustrates coherent and non-coherent combining of an RACH preamble.

For example, assuming that orthogonal covers n=0 to 5 are available, real values of orthogonal covers corresponding to sinusoidal complex signals with respect to two orthogonal covers n=1, 2 may be illustrated as in FIG. 11. The gNB may determine that frequency offsets of signals received from UEs are large in an environment in which UEs move at a high speed and perform coherent combining only for a half duration of a full RACH preamble duration and non-coherent combining for results obtained during respective half durations in the RACH preamble. In this case, it may be easily appreciated as illustrated in FIG. 11 that orthogonal covers of the respective half durations have non-orthogonal characteristics.

Thus, if a frequency offset occurring in a channel is too high to perform coherent combining during a full duration of the RACH preamble, orthogonal covers to be used for the RACH preamble need to be restricted. For example, if resource indexes used to define or distinguish between orthogonal covers of the RACH preamble are n={0, 1, 2, 3, 4, 5} as illustrated in FIG. 8, when the gNB uses coherent combining for T/2 corresponding to half of an RACH preamble duration T due to the frequency offset, only resource indexes n={0, 2, 4} or {1, 3, 5} may be used as RACH resources so that RACH sequence resources are separated as far as possible. In addition, resource indexes defined for orthogonal covers may be limitedly used even with respect to the case in which an RACH preamble duration of a different length per UE group, i.e., a different number of repetitions for a base sequence of the same length, is used. In other words, orthogonal cover code(s) available according to the number of repetitions may be limited. This may be equally applied even to the case in which the DFT vector is used as the orthogonal cover.

When the gNB uses partial duration coherent combining, the gNB may inform UE(s) of a root index set, a cyclic shift unit $N_{CS}$, a repetition factor N, and an OC limitation factor in order to inform the UEs that only a part of all orthogonal covers for the RACH are used. Herein, information about the OC limitation factor may correspond to the ratio of the number of actually available orthogonal covers to the repetition factor N, i.e., maximally available N orthogonal covers, or may be information indicating indexes n of actually available orthogonal covers. For example, if the repetition factor N is 12 and the gNB performs coherent combining in units of a duration equally divided into ¼ (=1/M) from a full RACH preamble duration, the gNB may inform the UE of an available orthogonal cover signal set using the following methods. In addition to the following methods, various methods may be used by the gNB to provide the UE with information about the orthogonal cover signal set available to the UE and to perform signaling to configure an RACH preamble (sequence) resource set using the information about the orthogonal cover signal set.

Example a. N=12, M=4

This example indicates that only ¼ of 12 orthogonal cover signals are used. A method of selecting indexes corresponding to ¼ among indexes of the 12 orthogonal cover signals is predefined (between the gNB and UEs in the standard specification) and a set of orthogonal cover signals available to the UE is determined according to the selection method.

Example b. N=12, {0, 4, 8}

Resource indexes 0 to 11 of 12 orthogonal cover signals are mapped (in advance, by configuration information, or by a specific rule) and orthogonal cover signals having indexes 0, 4, and 8 among the orthogonal cover signals 0 to 11 constitute a set of orthogonal cover signals available to the UE.

Example c. N=12, Number of Orthogonal Covers=3

This example indicates that only 3 of 12 orthogonal cover signals are used. A method of selecting 3 indexes from among indexes of the 12 orthogonal cover signals is predefined (in the standard specification or between the gNB and the UEs) and a set of orthogonal cover signals available to the UE is determined.

The above methods of limiting the orthogonal cover signal set to be applied to the preamble sequence part may be equally applied not only to Method I using the sinusoidal complex signal as the orthogonal cover but also Method II using the DFT vector as the orthogonal cover. If an orthogonal cover signal set to be applied to the preamble sequence part is limited, the DFT vector applied to or multiplied by each sequence block in the RACH preamble may be modified, for example, as follows.

$$\exp\left\{-j\left(\frac{2\pi \cdot i \cdot L \cdot n}{N} + \theta\right)\right\} \qquad \text{Equation 8}$$

where N denotes the number of repetitions, n denotes an index for an orthogonal cover used to distinguish between (preamble sequence) resources, and θ denotes any phase. i denotes an index of a repeated individual short block consisting of base sequences. For example, if a short base sequence is repeated N times within the RACH preamble, then i may be i=0, . . . , N−1 or i=1, . . . , N. L denotes a value used as the above-mentioned OC limitation factor is applied. When the ratio of resources to be used (i.e., orthogonal covers to be used) to the maximum number of orthogonal covers defined as the number of repetitions is r (i.e. OC limitation factor M), L may be defined as 1/r. For example, when the total number of orthogonal covers is 12 and the number of orthogonal covers that the gNB desires to actually use is 3, L becomes 4 (r=3/12).

The UE receives the above information (e.g., the root index set, cyclic shift unit $N_{CS}$, repetition factor N, and OC resource limitation factor M) from the gNB. The UE configures sequences consisting of cyclic-shifted versions for root sequences of respective root indexes in the root index set and configures an orthogonal cover set available to the UE based on the OC resource limitation factor for each sequence, thereby configuring a total RACH preamble (sequence) resource set. The UE selects a preamble sequence according to a determined rule from among sequence resources in the RACH preamble (sequence) resource set to perform RACH transmission.

2-2) Code Resource Allocation Method and Signaling Method in gNB

If a sequence part of an RACH preamble is used by repeating a short base sequence as described above, one or multiple base sequences are used to secure a sequence resource and an RACH preamble (sequence) resource is configured using an orthogonal cover signal for each base sequence. However, if UEs move at a high speed or frequency offsets of the UEs greatly appear in an environment in which gNB operates as mentioned above, a phase of an RACH preamble received by the gNB during an RACH preamble duration shows fast movement. In this case, performance gain caused by coherent combining may not be present or gain caused by coherent combining may be present but a false alarm for an RACH preamble resource on which the UE does not perform transmission may increase. Hereinafter, application of the present invention to an environment in which gain caused by coherent combining is present but a false alarm increases will be discussed.

For an RACH procedure of a cell in which the gNB operates, for example, a length-139 ZC sequence and $N_{CS}=18$ may be used and 8 cyclic-shifted versions may be used for one ZC sequence (e.g., root index=15). In this case, when the repetition factor N is 4 and 4 orthogonal covers are available, 32 RACH preamble sequences may be configured. However, as mentioned above, if a frequency offset between the gNB and the UE greatly appears due to instability of an oscillator and movement of the UE, a false alarm between RACH preamble sequences corresponding to adjacent orthogonal cover sequences on the frequency axis may increase. To prevent this phenomenon, the gNB may configure an RACH preamble (sequence) resource to use only a part of all orthogonal cover signal resources (e.g., when the repetition factor N is 4, orthogonal covers having resource indexes n={0, 2} are used among orthogonal covers having resource indexes n={0, 1, 2, 3}) available to the gNB, as described above, in an environment (e.g., cell) in which it is determined that the frequency offset is large. In this case, the number of RACH preamble sequences that may be generated from one ZC sequence is reduced to 16 from 32. To increase the number of preamble sequences which are reduced as the number of orthogonal covers used for the RACH preamble decreases, the gNB may allocate an additional ZC (e.g., use root indexes {15, 128} or use a modified ZC sequence in addition to a normal ZC sequence) and use the same orthogonal cover signal even for the added sequence (e.g., a ZC sequence of root index 128, which is an added base ZC sequence, or an added modified ZC sequence). However, generally, the added sequence has higher cross-correlation with a sequence having a different root index than a root sequence. If a receiver performs coherent combining for short sequences repeated in an RACH preamble duration, cross-correlation between the short sequences may not be suppressed or reduced even when coherent combining is performed unlike white noise suppressed or reduced due to coherent combining. To avoid this problem, the present invention proposes that only a part of orthogonal cover signals available to the gNB be used due to increase in a frequency offset and that orthogonal cover signals for root sequences be differently allocated when an additional root or base sequence is allocated for the RACH procedure. For example, when a base sequence having root indexes {15, 128} and a repetition factor N of 4 are used, an orthogonal cover signal of resource indexes n={0, 2} for a resource index 15 and an orthogonal cover signal of resource indexes n={1, 3} for a resource index 128 may be configured by the gNB or may be defined in the NR system. Thus, when different orthogonal cover signal(s) are used for different indexes, orthogonal covers of different resource indexes change phase while a base sequence for an RACH preamble is repeated in an RACH preamble duration. Therefore, if the gNB performs coherent combining between preamble sequences having different root indexes (e.g., root indexes {15, 128}), an effect of suppressing cross-correlation in a final output stage is obtained by randomization according to phase change.

To minimize deterioration in RACH reception performance caused by a frequency offset, using the above characteristics, the gNB may use a plurality of root sequences and allocate orthogonal cover signals so that different orthogonal cover signals may be used for the plural root sequences. In this case, adjacent gNBs may obtain the same effect as increase in the number of base sequences by using different orthogonal cover signals for the same base sequence. That is, when a short base sequence is repeated and an RACH preamble (sequence) resource is configured using a plurality of root sequences while an orthogonal cover signal is used for a base sequence, the present invention may suppress an influence caused by cross-correlation between sequences of different UEs during coherent combining by non-overlapping or distributing orthogonal cover signals used for the plural root sequences.

Thus, when the resource is configured, the gNB should efficiently inform the UE of root index(es) and orthogonal cover signal index(es) of sequence(s) for the RACH preamble. To this end, the gNB may configure sequence(s) for the RACH preamble using a pair of a root index corresponding to a base sequence and an orthogonal cover signal index. For example, the gNB may configure, for UE(s), sequence(s) available in a cell for the RACH using the following methods.

>An available resource set is explicitly signaled using a combination of {root index $R_i$, orthogonal cover signal index $C_j$}. Herein, the orthogonal cover signal index $C_j$ corresponds to the above-described resource index n.

For example, it is assumed that root indexes are {15, 128}, a repetition factor N is 4, and the number of orthogonal cover signals (per root index) is 2.

In this case, a signaling format used by the gNB to signal an RACH preamble sequence resource to the UE may be as follows: $\{R_i, C_j\}$={15, 0}, {15, 2}, {128, 1}, and {128, 3}.

The UE configures a combination of (sequence) resources on which the UE is operable based on the signaling format.

>A root index set and base information of an orthogonal cover signal are signaled and an available resource set is generated or configured by a rule.

For example, it is assumed that root indexes are {15, 128}, the repetition factor N is 4, and the number of orthogonal cover signals is 2.

In this case, a signaling format used by the gNB to signal an RACH preamble sequence resource to the UE may be as follows: root index R={$R_i$, i=0, 1}={15, 128}, orthogonal cover signal index C={$C_j$, j=-0, 1}={0, 2}. Herein, an orthogonal cover signal set may be configured by various methods mentioned in Section 2-1 (e.g., method of Example a, Example b, or Example c) in addition to explicit signaling of orthogonal cover signal index $C_j$.

The UE may configure a resource set {root index $R_i$, (orthogonal cover signal index $C_j+i$) % N} as the RACH preamble sequence resource based on signaling from the gNB (i.e., RACH preamble resource configuration information). Herein, % may denote a modulo operator, i may denote the location of a corresponding root index in a root index set, and j may denote the location of a corresponding orthogonal cover signal in the orthogonal cover signal set. For example, Ro indicates 15 and $R_i$ indicates 128, for a root index set {15, 128}, and $C_O$ indicates orthogonal cover signal 0 and $C_1$ indicates orthogonal cover signal 2, for an orthogonal cover signal set {0, 2}.

>A root index set, base information of an orthogonal cover signal, the number of orthogonal cover signals to be used, and a stating offset of an orthogonal cover index to be used in a (maximum) set of available orthogonal cover signal indexes are signaled.

For example, it is assumed that root indexes are {15, 128}, a repetition factor N is 4, the number of orthogonal cover signals is 2, and a maximum available orthogonal cover set is {0, 1, 2, 3}.

In this case, the maximum available orthogonal cover set may be predetermined in the system or may be signaled, together with other parameters for RACH preamble configuration or separately.

The signaling format used by the gNB to signal the RACH preamble sequence resource to the UE may be as follows: root index {15, 128}, repetition factor N=4, number of orthogonal cover signals=2/{root index $R_i$, starting offset $O_i$}={{15, 0}, {128, 1}}.

The UE may generate or configure resource sets of {15, 0}, {15, 2}, {128, 1}, and {128, 3} using information about a root index, a starting offset, and an orthogonal cover signal index to be used by each root index, based on signaling from the eNB (i.e., RACH preamble resource configuration information).

>A resource set is configured by the gNB by combining a root index and an orthogonal cover signal index and a resource index in the resource set for a resource to be used by the gNB is signaled.

For example, it is assumed that root indexes are {1, 2, . . . , 138} and orthogonal cover signal indexes are {0, 1, 2, 3}. The following resource set may be configured: {{1, 0}, {1, 1}, {1, 2}, {1, 3}, {2, 0} {2, 1}, . . . , {138, 1}, {138, 2}, {138, 3}}. If the gNB desires to use {15, 0}, {15, 2}, {128, 1}, {128, 3}(for an RACH procedure of a cell) and if numbers are sequentially assigned from 0 to combinations of root indexes and orthogonal cover signal indexes in the resource set, the gNB may signal resource indexes {64, 66, 513, 515} indicating {15, 0}, {15, 2}, {128, 1}, {128, 3} among resources in the resource set to the UE under the assumption that numbers starting from 0 are sequentially assigned to combinations of root indexes and orthogonal cover signal indexes in the resource set. In addition, other methods of configuring a resource set and indicating a resource to be used to the UE may be used only if these methods may obtain the same effect as the above methods.

>In the LTE/LTE-A system, root sequences are determined in tables (refer to Table 2 and Table 3). If the gNB informs the UE of a root sequence number u and a cyclic shift unit $N_{CS}$, root sequence numbers are successively used in the tables in the LTE/LTE-A system so that the UE may generate or configure 64 preamble sequences including a cyclic-shifted version. Even in the present invention, a resource index set may not be explicitly signaled and only a base index (i.e., root index) may be signaled and a resource index set to be used for the RACH may be implicitly configured by a determined rule, as in the LTE system.

Upon receiving the above RACH preamble resource configuration information (e.g., the root index set, cyclic shift unit $N_{CS}$, repetition factor N, and OC resource limitation factor M) from the gNB, the UE configures a root index set, a cyclic-shifted version set for root indexes, and an orthogonal cover signal set for root indexes. The UE may generate or configure a total RACH preamble (sequence) resource set using the configuration information and select an RACH preamble sequence in the RACH preamble (sequence) resource set according to a determined rule, thereby performing RACH transmission.

Figure 12:
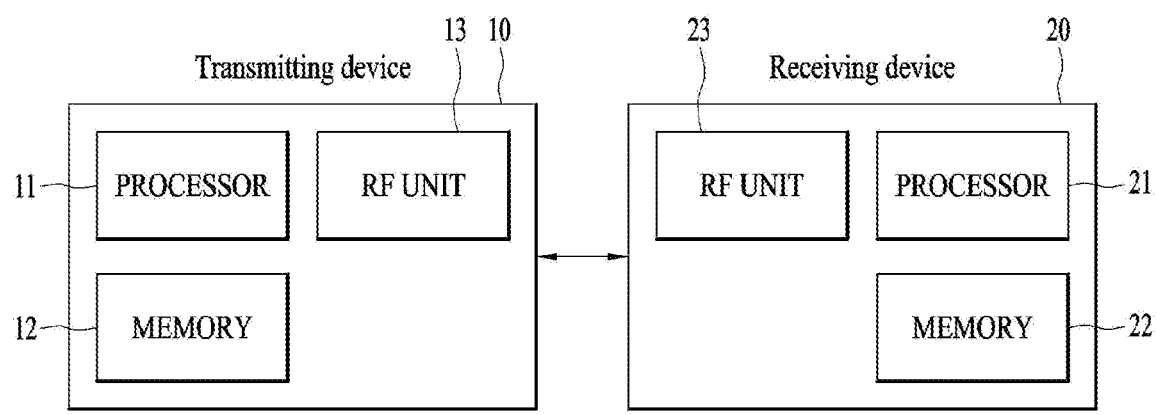
FIG. 12 is a block diagram illustrating elements of a transmitting device 10 and a receiving device 20 for implementing the present invention.

FIG. 12 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where N is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the present invention, the RF units 13 and 23 may support Rx BF and Tx BF. For example, in the present invention, the RF units 13 and 23 may be configured to perform the function illustrated in FIG. 2.

In the embodiments of the present invention, a UE operates as the transmitting device 10 in UL and as the receiving device 20 in DL. In the embodiments of the present invention, a gNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the gNB will be referred to as a gNB processor, a gNB RF unit, and a gNB memory, respectively.

According to the present invention, the gNB processor may control the gNB RF unit to transmit preamble sequence resource configuration information (e.g., a root index, a cyclic shift unit $N_{CS}$, a repetition factor N, and/or the number of available orthogonal cover signals) for an RACH to the UE. The gNB processor may control the gNB RF unit to attempt to receive an RACH preamble from UE(s) based on the preamble sequence resource configuration information. The UE processor according to the present invention may generate the RACH preamble based on the preamble sequence resource configuration information. The UE processor may control the UE RF unit to transmit the RACH preamble. The UE processor may generate a preamble sequence part by repeating a base sequence and multiplying an orthogonal cover signal according to the present invention by the repeated base sequence. The base sequence may be a root sequence or a sequence obtained by applying a cyclic shift to the root sequence. If the base sequence is the root sequence, the UE processor may generate the preamble sequence part by cyclically shifting an orthogonal covered sequence which is obtained by applying the orthogonal cover signal to the base sequence.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

The invention claimed is:

1. A method of transmitting a random access preamble by a user equipment (UE) in a wireless communication system, the method comprising:
   receiving sequence resource configuration information for random access;
   generating a preamble sequence having a length of $T_{RACH}$ based on the sequence resource configuration information; and
   transmitting a random access preamble including the preamble sequence,
   wherein the preamble sequence satisfies the following: the preamble sequence includes a base sequence N times and comb-type mapping is performed upon the base sequence at a frequency spacing of every $N*1/T_{RACH}$ starting from a location $n*1/T_{RACH}$ in a frequency domain, where N is an integer larger than 1 and n is one of 0, . . . , N−1.

2. The method of claim 1, wherein the base sequence is a root Zadoff-Chu sequence or a sequence obtained by applying a cyclic shift to the root Zadoff-Chu sequence.

3. The method of claim 2, wherein the sequence resource configuration information includes information regarding the root Zadoff-Chu sequence, a cyclic shift unit for the cyclic shift, and N.

4. The method of claim 2, wherein the sequence resource configuration information further includes information indicating a subset of candidate values of n.

5. The method of claim 1, wherein the preamble sequence is obtained by multiplication of the base sequence repeated N times in the time domain by a sinusoidal signal having a frequency of $j*n*1/T_{RACH}$, where j is an imaginary unit.

6. The method of claim 5, wherein the preamble sequence includes a sequence obtained by multiplying the base sequence repeated N times in the time domain by the sinusoidal signal $e^{-j2\pi n \Delta f t}$ or a sequence obtained by multiplying an i-th repetition of the base sequence for i=0, . . . , N−1 by $e^{-j2\pi n \Delta f(t+i*\Delta T)}$, where $\Delta T$ is the length of the base sequence.

7. A user equipment (UE) for transmitting a random access preamble in a wireless communication system, the UE comprising,
   a radio frequency (RF) unit,
   a processor configured to control the RF unit, wherein the processor is configured to:
control the RF unit to receive sequence resource configuration information for random access;
generate a preamble sequence having a length of $T_{RACH}$ based on the sequence resource configuration information; and
control the RF unit to transmit a random access preamble including the preamble sequence, and
wherein the processor is configured to generate the preamble sequence satisfying the following: the preamble sequence includes a base sequence N times and comb-type mapping is performed upon the base sequence at a frequency spacing of every $N*1f/T_{RACH}$ starting from a location $n*1/T_{RACH}$ in a frequency domain, where N is an integer larger than 1 and n is one of 0, . . . , N−1.

8. The UE of claim 7, wherein the base sequence is a root Zadoff-Chu sequence or a sequence obtained by applying a cyclic shift to the root Zadoff-Chu sequence.

9. The UE of claim 8, wherein the sequence resource configuration information includes information regarding the root Zadoff-Chu sequence, a cyclic shift unit for the cyclic shift, and N.

10. The UE of claim 9, wherein the sequence resource configuration information further includes information indicating a subset of candidate values of n.

11. The UE of claim 7, wherein the preamble sequence is obtained by multiplication of the base sequence repeated N times in the time domain by a sinusoidal signal having a frequency of $j*n*1/T_{RACH}$, where j is an imaginary unit.

12. The UE of claim 11, wherein the preamble sequence includes a sequence obtained by multiplying the base sequence repeated N times in the time domain by the sinusoidal signal $e^{-j2\pi n \Delta f t}$ or a sequence obtained by multiplying an i-th repetition of the base sequence for i=0, . . . , N−1 by $e^{-j\pi n \Delta f(t+i*\Delta T)}$, where $\Delta T$ is the length of the base sequence.

13. A method of receiving a random access preamble by a base station (BS) in a wireless communication system, the method comprising:
transmitting sequence resource configuration information for random access; and
receiving a random access preamble including a preamble sequence having a length of $T_{RACH}$ based on the sequence resource configuration information,
wherein the preamble sequence satisfies the following: the preamble sequence includes a base sequence N times and comb-type mapping is performed upon the base sequence at a frequency spacing of every $N*1/T_{RACH}$ starting from a location $n*1/T_{RACH}$ in a frequency domain, where N is an integer larger than 1 and n is one of 0, . . . , N−1.

14. A base station (BS) for receiving a random access preamble in a wireless communication system, the BS comprising,
a radio frequency (RF) unit,
a processor configured to control the RF unit,
wherein the processor is configured to:
control the RF unit to transmit sequence resource configuration information for random access; and
control the RF unit to receive a random access preamble including a preamble sequence having a length of $T_{RACH}$ based on the sequence resource configuration information, and
wherein the preamble sequence satisfies the following: the preamble sequence includes a base sequence N times and comb-type mapping is performed upon the base sequence at a frequency spacing of every $N*1/T_{RACH}$ starting from a location $n*1/T_{RACH}$ in a frequency domain, where N is an integer larger than 1 and n is one of 0, . . . , N−1.

* * * * *